United States Patent [19]

Catonne et al.

[11] 4,175,027

[45] Nov. 20, 1979

[54] APPARATUS FOR RECOVERING ZINC FROM RESIDUES

[75] Inventors: Jean-Claude Catonne, La Celle Saint-Cloud; Jean Royon, La Varenne; Maurice Bonnemay, Boulogne; Marie-Thérèse Descarsin, Paris; Marcel Bernard-Maugiron, Meulan; Henri Fencki, Le Cateau; Jean-Francois Fayolle, Bertry, all of France

[73] Assignee: Societe d'Etudes pour la Recuperation Electrolytique du Zinc, Paris, France

[21] Appl. No.: 831,918

[22] Filed: Sep. 9, 1977

[30] Foreign Application Priority Data

Sep. 10, 1976 [FR] France ............... 76 27302
Dec. 4, 1977 [FR] France ............... 77 01942
Aug. 9, 1977 [FR] France ............... 77 25416

[51] Int. Cl.² ............................................. C25C 7/00
[52] U.S. Cl. ................................................. 204/275
[58] Field of Search ............... 204/272, 275, 9, 25, 204/27, 28

[56] References Cited

U.S. PATENT DOCUMENTS

| 1,600,257 | 9/1926 | Topping | 204/13 |
| 2,569,367 | 9/1951 | Bradner et al. | 204/272 |
| 3,475,296 | 10/1969 | Campbell | 204/272 |
| 3,887,440 | 6/1975 | Ichioka | 204/13 |

Primary Examiner—R. L. Andrews
Attorney, Agent, or Firm—Brumbaugh, Graves, Donohue & Raymond

[57] ABSTRACT

In a process for recovering zinc from residues containing it, particularly from ashes and hard-spelters coming from galvanizing baths, and which comprises the extraction by electrolysis of the zinc contained in the alkaline or acid solutions obtained. The solutions deriving from the ashes are obtained by dissolving their relatively low metallic zinc content granulometric fraction, the high metallic zinc content granulometric fraction of these ashes being re-introduced directly into the galvanizing bath advantageously after a leaching treatment and the solutions deriving from the hard-spelters are obtained by dissolving them either by having recourse to a corrosion cell or by forming by means of these hard-spelters the anodes of an electrolysis circuit.

5 Claims, 5 Drawing Figures

APPARATUS FOR RECOVERING ZINC FROM RESIDUES

The invention has for its object a process for recovering zinc from residues containing it.

It also has as its object an electrolysis installation which can be used in this process.

Residues containing zinc are particularly those coming from refining installations and zinc foundries as well as from hot galvanising baths formed by molten zinc in which are immersed the iron-base objects which are to be coated with a layer of metallic zinc.

The residues of these hog galvanising baths are formed by:

"ashes" located on the surface of the bath, these ashes resulting particularly from the oxidation of the bath and comprising oxide covered metallic zinc and by "mattes", drosses or more precisely hard-spelters located at the bottom of the bath and formed by "pseudo-alloys" between the zinc and particularly iron.

The proportion of zinc in these residues and the relatively high price of this metal justify the effort made to recover it. Up to now, the recovery processes which have been proposed relate principally to the treatment of the mattes in which the zinc is practically entirely in the metallic state. For this purpose, in prior processes, the recovery of the zinc contained in the mattes was obtained principally by distillation. Such processes permit the metallic zinc to be recovered directly with a high degree of purity. They have however the disadvantage of being very costly.

In hot galvanising baths, the total weight of the ahes produced represents often about 15% of the weight of the zinc consumed. This value is however only an indication since the proportions may vary greatly and it is not rare to have values of the order of 20% and more in certain installations and for certain types of treatment. Moreover, the metallic zinc content of these ashes is high, such ashes containing for example up to about 85% of Zn 54% of which is in metallic form.

The total weight of the mattes produced represents generally about 12% of the weight of the zinc consumed, this proportion being able to reach about 20%. The zinc content of the mattes is generally of the order of 95%.

The invention has as its object especially to make available to the user a process for supplying a product with high zinc content able to be directly reintroduced into the galvanising bath.

To do this the process of the invention is characterised by the fact that it comprises the extraction by electrolysis of the zinc contained in the alkaline or acid solutions obtained;

as far as the ashes are concerned, by dissolving their granulometric fraction having a relatively low metallic zinc content, the granulometric fraction with a high metallic zinc content of the ashes being re-introduced directly into the galvanising bath advantageously after a leaching treatment, as far as the mattes are concerned, by dissolving them either by having recourse to a corrosion cell or by forming by means of these mattes the anodes of an electrolysis circuit.

In the above-mentioned process, the high zinc content granulometric fraction of the ashes is that one whose zinc content is sufficient so that the re-introduction at each re-charging of the totality of this fraction into the bath simultaneously with zinc of high purity does not lower the zinc content of the galvanising bath brought back to its initial volume below imposed limit values.

In one advantageous embodiment, this granulometric fraction corresponds to particles of a size $>100\mu$.

In another advantageous embodiment of said process, magnetic removal of the iron from the ashes is provided, preferably after the separation of the ashes into two granulometric fractions on the high zinc content fraction directly introduced.

In another advantageous embodiment of said process, the electrolyte used for the leaching of particles of the high zinc content granulometric fraction, for the dissolving of the granulometric fraction of the ashes $<100\mu$, for forming the corrosion cell in which the mattes are placed and for the anodic dissolving treatment, presents a pH of at least 8.5 and preferably $>9$ and is an ammoniacal alkaline solution containing chloride ions and preferably buffered with carbonate.

The invention also aims at making available to the user an electrolysis installation capable of extracting zinc from alkaline or acid solutions containing it, more particularly from solutions obtained within the scope of the above-defined process.

The electrolysis installation of the invention for the continuous extraction of zinc from solutions of the kind in question which comprises a cathode in the form of a cylinder of revolution able to be rotated about its horizontal axis and disposed above a cylindrical anode having its concavity directed towards the cathode and having a generatrix parallel to the axis of this latter which it encloses at least partially, is characterised by the fact that it comprises means for conveying the solutions to be treated and which form the electrolyte, into the inter-electrode space between the cathode and the anode in a direction substantially tangential to the surface of the cathode, the inter-electrode space being defined laterally by walls substantially perpendicular to the axis of the cathode, located at a small distance from the end thereof, so that the flow is conservative along the cathode surface.

According to one advantageous embodiment of said installation, the means for conveying the electrolyte are arranged so that the injection of this latter takes place uniformly along the cathode in a direction opposite the direction of rotation thereof.

The invention also has as its object an installation for the continuous extraction of zinc from said solutions which comprises a cathode in the form of a cylinder of revolution able to be rotated about its horizontal axis and disposed above a cylindrical anode having its concavity directed towards the cathode and having a generatrix parallel to the axis of this latter which it encloses at least partially, this installation being characterised by the fact that the inter-electrode distance decreases from the location where the electrolyte is injected.

The invention also has as its object an installation for the continuous extraction of zinc from said solutions which comprises a cathode in the form of a cylinder of revolution able to be rotated about its horizontal axis and disposed above a concave anode cut out in a cylinder of revolution having a radius greater than that of the cathode, this installation being characterised by the fact that the axes of the cathode and of the anode are parallel but not merged and that the interelectrode distance decreases from the location where the electrolyte is injected.

In accordance with another advantageous embodiment of said installation, the means for conveying the electrolyte into the inter-electrode space are formed by injection nozzles located substantially along a line parallel to a generatrix of the cathode and fed so that the electrolyte is distributed evenly along the cathode.

According to another advantageous embodiment of said installation, the means for conveying the electrolyte into the inter-electrode space are formed by a tube parallel to a generatrix of the cathode, fed with electrolyte and comprising an arrangement of injection apertures for the electrolyte whose number, positions and diameters are chosen so that the injection of the electrolyte takes place evenly along the whole of the cathode.

According to another advantageous embodiment of said installation, the surface of the cathode is formed from a metal chosen from those which permit the metallic zinc deposit to be easily detached and which have a high hydrogen over-voltage.

According to yet another advantageous embodiment, the installation comprises a roller having an axis parallel to that of the cathode and, preferably, having a radius greater than that of this latter, this roller being rotated at a tangential speed equal to that of the cathode, the zinc deposit being rolled up on this roller.

According to yet another advantageous embodiment of said installation, the ratio between the diameter of the cathode and its effective length is from 0.60 to 0.85.

According to yet another embodiment of said installation, the means for rotating the cathode are adjusted so that the duration of immersion in the electrolyte of a given point of the cathode is such that the thickness obtained during immersion in the electrolyte is sufficient for the cohesion of the metal obtained to be greater than the adherence of the metal to the substrate.

The invention will be better understood with the help of the complement of description which follows and the accompanying drawings, which complement of description and drawings relate to advantageous embodiments.

FIG. 1 of these drawings shows a schematic view of an installation for recovering zinc by using the process of the invention.

Figure 1:
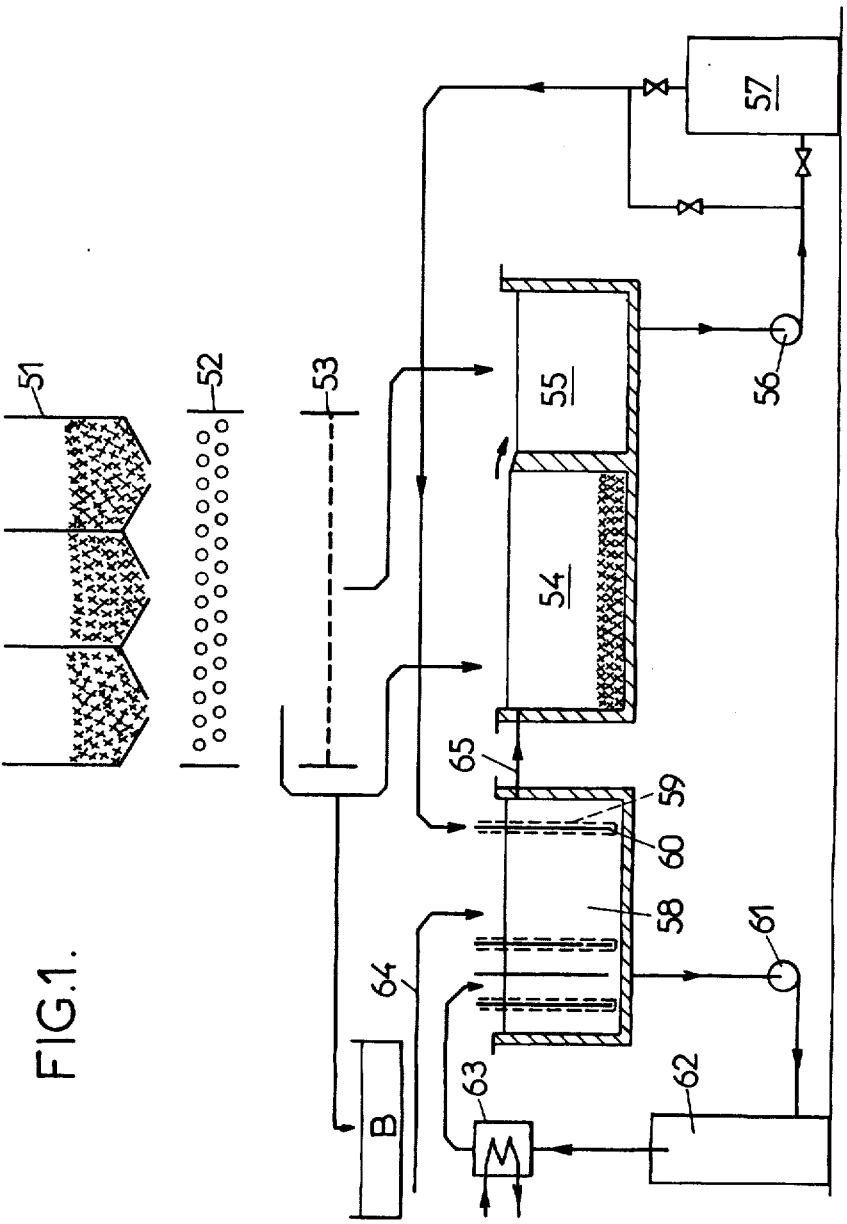

This being the case, having at one's disposal residues of galvanising baths, i.e. ashes and mattes, the following or equivalent is the way to set about recovering and extracting the zinc.

As far as the ashes are concerned, it has been noted that to the fraction(s) of the largest particles correspond the highest contents of metallic zinc.

In accordance with the invention, at least a part of the ashes recovered is used directly by subjecting them previously to crushing and pounding and to granulometric sorting and furthermore by eliminating preferably the ferromagnetic particles by magnetic sorting more or less thoroughly depending on the degree of purity desired.

These treatments permit the fractions to be separated, corresponding to the largest particles, whose metallic zinc content is sufficient to allow their industrial use without any other treatment.

It has in fact become evident that a thorough purification of the zinc contained in the ashes is not always indispensable (what counts in the end is indeed the quality and the minimum thickness of the metal deposited on the treated part) when it is then re-introduced into the galvanising bath.

As far as the quality of the zinc in the bath is concerned, two categories can generally be distinguished depending on the demands of the user of the final product.

In the first category, the user of different hot galvanised finished products does not demand a particular quality for the zinc used or, if he so demands, the analysis is effected on a sample of zinc taken from the galvanising tank. The minimum percentage of zinc in the tank must lie about 98.5% and experience shows that the content of the principal impurities in the bath may exceed the maximum values allowed in the standard for ingots NF A 55 101, whilst still remaining within reasonable limits when the bath is fed principally with zinc of good quality, type "Z7" for example, whose zinc content is at the minimum 99.5%.

In the second category, the user demands not only an analysis of the zinc on a sample taken from the galvanising tank, but demands furthermore, for feeding to the bath, ingots of zinc conforming to standard NF A 55 101. The galvanising procedure must satisfy the directions of the standards in force, for example: the particular standard UTE C 66.400 indicating particularly a minimum of 98.50% zinc in the bath.

It is thus possible, when the quality required corresponds to the first category defined above, to introduce simultaneously into the bath a main charge, formed from zinc of high purity, e.g. quality "Z7", and the granulometric fraction of high zinc content ashes.

This granulometric fraction of the ashes is that one whose zinc content is sufficient so that the re-introduction, at the moment of each re-charging of the bath, effected at regular intervals of the totality of this fraction simultaneously with zinc of high purity, does not lower the zinc content of the galvanising bath brought to its initial volume below imposed limit values.

It may seem surprising to be able to introduce into the metallic bath compounds initially in contact with this bath and which formed however a separate phase thereof. The reason why the particles of zinc which are in the ashes, in a high proportion as has already been mentioned, do not return by themselves to the principal phase of the bath, constituted by the molten zinc, is not perfectly elucidated. The hypothesis may be put forward that the metal particles are imprisoned by a "gangue" of non meltable oxide. The treatment of the ashes according to the invention, in particular the steps of crushing and sifting, by breaking this gangue, and although the oxide initially present in the ashes is only partially eliminated, would thus cause the releasing of metal particles which could then melt in the metallic phase of the bath, whereas the non eliminated oxides re-introduced with the zinc would simply be added to the phase forming the ashes.

The operations of crushing and sifting permit a separation of fractions which differ from each other not only in their mechanical properties but also in their chemical composition. The greater the size of the particles of ashes which are to be re-introduced into the bath, the higher the zinc content and the lower the oxide content will be of the corresponding fraction. According to the minimum size of the particles, the proportion of metallic zinc in the re-used fraction can be adjusted. Whatever this size, the proportion of oxides in the fraction re-introduced is less than it is in the aggregate in the whole of the initial ashes.

It has been found experimentally that the magnetic sorting effects an elimination of the ferromagnetic particles all the more efficient that the particles are not covered by a non ferromagnetic substance. This additional effect confirms the advantage of the fractionation treatments used according to the invention.

The proportion of ashes treated according to the process described above which may be introduced into a galvanising bath with the new charge of zinc, is limited by the proportion of zinc demanded for the bath in most cases by technical standards in this field. It has been pointed out that the hot galvanising bath, corresponding to the first category defined above, contains about 98.50% zinc, i.e. an impurity content not exceeding 1.5%. The metallic zinc of high purity (99.5%), which forms usually the major part of the charge, since it is clearly above the necessary limit, it is then possible to introduce into the bath zinc recovered from the ashes and containing impurities in a proportion even greater than 1.5%, it being understood that the mixture of recovered zinc and zinc of high purity introduced into the bath must not present overall an impurity content greater than 1.5%.

The composition of the ashes is bound up with numerous parameters, and particularly with the way in which the ashes are taken. The composition of the different fractions of the ashes obtained obviously depends on the composition of the initial ashes and can thus vary widely when the operating conditions change. The information given in the examples has then only an indicatory value.

For ashes of the most current composition coming from a hot galvanising bath, after crushing, it has been noted that in practice the granulometric fraction whose particles have sizes equal to or greater than 100μ, preferably after having been subjected to magnetic sorting, satisfies the conditions exposed above and can be advantageously re-introduced as a whole into the bath from which they come, as a complement to the conventional zinc charge, and this without substantially modifying the performance of the bath.

As an example there is given below the composition of the two granulometric fractions in question:

| | < 0.1 mm | > 0.1 mm |
|---|---|---|
| % of ashes | 27.8 | 72.2 |
| % Zn° | 55.5 | 75.5 |
| % Zn$^{II}$ | 28.0 | 16.5 |
| total % of Zn | 83.5 | 92 |

In practice, a first separation of the particles is advantageous in order to remove from the mixture of ashes the largest zinc particles whose size is for example equal to or greater than about 3 mm. Experience shows that the meltable part of these particles is formed practically exclusively of metallic zinc and can be naturally re-introduced such as it is into the bath. This separation can advantageously be carried out by means of a sifting device.

Generally the means used for the treatment of the ashes according to the invention, i.e. crushing, separation of the different fractions, elimination of the ferromagnetic particles, are the conventional means used for this type of operation; a ball or cylinder crusher, sifter centrifugal separator or cyclone separator, deflection magnetic sorting apparatus with moving surface moving in a magnetic field.

The crushing of the ashes and waste is advantageously carried out at a temperature between about 200° and 250° C., at which the zinc is particularly crumbly. Preferably, to avoid having to re-heat the products, they are crushed when their temperature decreasing from their initial temperature at the moment of their recovery, reaches the value indicated above.

It is wished to introduce into the bath the higher granulometry fraction of the ashes, i.e. that which has a high zinc content, without it being necessary to add pure zinc, said fraction is subjected before its introduction to a leaching treatment which aims at dissolving almost the whole of the ZnO, leaving particles of zinc whose impurity content is less than 1.5%.

The electrolyte used for the leaching treatment is advantageously formed by an ammoniacal solution containing Cl$^-$ ions and whose pH is greater than 8.5, preferably greater than 9 and advantageously close to 10, whose ammonia content is advantageously close to 6 moles $\times 1^{-1}$, whose Zn$^{II}$ content is 0.7 to 1.5 moles $\times 1^{-1}$ and advantageously close to 1 mole $\times 1^{-1}$, whose concentration in Cl$^-$ ions, provided in the form of NH$_4$Cl, is about twice the Zn$^{II}$ content and advantageously close to 3 moles $\times 1^{-1}$, the electrolyte in question being buffered by means of 5 to 35 g/l and advantageously 20 g/l of ammonium carbonate.

As far as the lower zinc content granulometric fraction is concerned, it is subject to a dissolving treatment, preferably in said electrolyte.

This fraction may be formed of 55.5% of zinc metal, 35% of zinc oxide and 9.5% impurities.

When this fraction is introduced into the electrolyte with mechanical stirring, the zinc oxide is immediately dissolved in accordance with the reaction diagram:

$$ZnO + H_2O + 2OH^- \rightarrow Zn(OH)_4^{2-}$$

At the pH of the electrolyte, the zincate complex is not stable and it dissociates according to the balance:

$$Zn(OH)_4^{2-} \rightleftharpoons Zn^{++} + 4OH^-$$

The Zn$^{++}$ ions are then chelated according to the reactions:

$$Zn^{++} + 2NH_3 + 2Cl^- \rightleftharpoons Zn(NH_3)_2Cl_2$$

$$Zn^{++} + 4NH_3 \rightleftharpoons Zn(NH_3)_4^{2+}$$

The impurities contained in the ashes precipitate in the form of hydroxides and are thus eliminated from the electrolyte. The metallic zinc freed of its zinc oxide coating is in the form of very small particles which are chemically attacked by the OH$^-$ ions present in the solution according to the reaction diagram:

$$Zn + 4OH^- \rightleftarrows Zn(OH)_4^{2-} + 2e^-,$$

the zincate formed dissociating and the $Zn^{++}$ being chelated in the manner described above.

During the dissolving of this fraction, the electrolyte takes on a blackish hue due to the presence of particles in suspension. A continuous filtration test on a cartridge filter enables a perfectly limpid electrolyte to be obtained but the cartridges become very quickly clogged being covered with a greasy sludge greyish in colour. This sludge which is probably a residue of the hot fluxing bath (bath in which the objects to be galvanished are dipped before being immersed in the Zn) is insoluble in acids, concentrated or diluted, bases and principal organic solvents. The only means of eliminating this sludge consists in washing with water and brushing energetically the filter cartridge. However, after a few cycles of use, the deeply clogged cartridge becomes unusable.

Filtration tests on panel filters gave good results, the elimination of the sludge by brushing the panels being fairly easy, the electrolyte after filtration becoming limpid again. The principal disadvantage of this mode of filtration is the relatively small volume of electrolyte filtered before clogging up of the panels, which means frequent cleaning thereof.

In an attempt to avoid continuous filtration of the electrolyte which implies the permanent use of a pump fitted with a filtration system, decantation was used to try and eliminate these particles in suspension.

During the dissolving of the ashes, it was noted that stopping the mechanical stirring of the bath permitted a fairly rapid decantation of a large fraction of the particles, only the very fine particles which take longer to decant remaining in suspension.

The above-defined electrolyte permits the whole of the zinc contained in the ashes to be dissolved.

When its $Zn^{II}$ content reaches a value close to 1.2 to 1.5 moles $\times 1^{-1}$, it is subjected to electrolysis for extraction of the zinc.

As an example, 1100 g of ashes were introduced having a granulometry lower than 100$\mu$ and a composition substantially equal to that described above (table) at a constant speed of 1500 g/h$^{-1}$ by means of a helical screw into a tank containing 35 l of electrolyte having a composition substantially equal to that previously described and whose $Zn^{II}$ content is equal to 1.10 moles $\times 1^{-1}$. Stirring of the electrolyte was achieved by means of a rotator turning at 60 rpm$^{-1}$. Forty-five minutes after beginning the feeding of the ashes, i.e. a minute after the end of this feeding, the $Zn^{II}$ content of the electrolyte was equal to 1.5 moles $\times 1^{-1}$. No non dissolved zinc particles were noted at the bottom of the tank.

As far as the mattes are concerned, the zinc that they contain can be recovered by electrolytic purification. For this, the mattes are placed at the anode of an electrolytic cell whose electrolyte forms with the zinc soluble complexes, whereas the impurities are eliminated in the form of insoluble matter, the complexes formed being simultaneously reduced at the cathode to give metallic zinc in a compact layer easily recoverable.

In order to carry out the anodic dissolving of the mattes, it is in practice necessary to give them a particular geometrical configuration tied on the characteristics of the electrolytic cell used. Normally, the anodes will be in the form of plates. It is thus necessary to shape the mattes which in the rough state, are in the form of more or less large and regular metal blocks. This shaping can be achieved for example by moulding molten mattes.

The electrolyte used is advantageously that described above.

In view of the preferential dissolving at the middle of these anodes formed from the mattes, it is advisable to remove these anodes before they break and to remould them to give them back the appropriate geometric shape.

It is necessary to dispose between the electrodes a porous diaphragm capable of preventing, on the one hand, the particles of graphite formed by the exfoliation of the anodes from coming into contact with the cathode and, on the other hand, the insoluble hydroxides formed during the anodic dissolving of the mattes from coming on to the cathode.

In order to avoid shaping the mattes and having to remove them from electrolyser with a view to their remoulding and reshaping, they are advantageously dissolved by forming a corrosion cell and by electrolytically extracting thereform the zinc of the solution obtained.

To this end, the mattes are disposed, if need be after crushing or pounding in order to increase their specific area, in a metal tank, incorrodible by the electrolyte solution, serving as a corrosion cell.

The electrolyte is advantageously that described above, the starting $Zn^{II}$ content being less than 1 mole$\times 1^{-1}$.

The material forming the tank must satisfy the following criteria:

it must be more electropositive than the zinc so that coupling may take place, chemically inert with respect to the electrolyte, operable as the cathode of the corrosion cell whose anode is formed by the mattes.

Stainless steel, particularly stainless steel 18/8, gives good results.

An electrolyte flow is provided between the electrolysis cell and the tank of the corrosion pile. This pile is the seat of the following electrolytic reactions:

$$\begin{array}{ll}
Zn \longrightarrow Zn^{2+} + 2e^- & \text{on the mattes} \\
\frac{1}{2}O_2 + H_2O + 2e^- \longrightarrow 2OH^- & \text{on the metal} \\
\hline
Zn + \frac{1}{2}O_2 + H_2O \longrightarrow Zn^{2+} + 2OH^- & \text{of the tank}
\end{array}$$

The oxygen comes either from the ambient air or advantageously from the anodic reaction of the electrolyte.

In the electrolytic cell used for depositing the zinc in the metal state, the reverse reactions develop:

$$\begin{array}{ll}
Zn^{2+} + 2e^- \longrightarrow Zn & \text{cathode} \\
2OH^- \longrightarrow 2e^- + H_2O + \frac{1}{2}O_2 & \\
\hline
Zn^{2+} + 2OH^- \longrightarrow Zn + \frac{1}{2}O_2 + H_2O & \text{anode}
\end{array}$$

As a whole, the phenomenon is analysed as the dissolving of the zinc of the mattes and the depositing of the purified zinc at the cathode of the electrolysis cell with, in addition, transport of the oxygen released at the anode of the electrolysis cell towards the cathode of the corrosion cell.

To facilitate these exchanges, it is advantageous to have a good matte area as well as a large cathode surface in the corrosion cell.

Since the operation of such a cell is governed by the cathode polarisation, it is desirable to increase the area of the tank.

Advantageously, the mattes introduced will have been previously crushed or pounded, which is more readily achieved at a temperature preferably between 200° and 250° C.

Furthermore, it is advantageous to take the electrolyte from the anode compartments of the electrolysis cell to send it to contact the cathode of the corrosion cell. Thus is best promoted the transport of the oxygen occurring in the anode reaction of the electrolyser.

The flow circuit for the electrolyte must also comprise filtration devices for eliminating particularly the colloidal hydroxides formed, in particular iron hydroxide, and in a general way all the solid particles in suspension which might impair the depositing of purified zinc at the cathode of the electrolyser.

The solid particles can also be eliminated by decanting.

The principal advantage of the corrosion cell is the use of non shaped mattes, but this cell offers still other advantages. It can in particular serve equally well for the treatment of mattes as for that of ashes. In this case, the tank of the corrosion cell replaces the dissolving tank for the ashes such as it was initially provided. If necessary, mattes and ashes can even be treated simultaneously. Furthermore, since the major part of the iron remains in the metal state in the conditions of this treatment, it is advantageous to eliminate it magnetically from the liquid medium.

In the device forming the corrosion cell, during the treatment of the ashes and/or of the mattes, the pH of the electrolyte is kept constant in the circuit of the anolyte. The consumption of $OH^-$ ions during the anode reaction of the electrolyser, is practically compensated for by the formation of the same kind of ions during the cathode reaction of the corrosion cell, which cannot be achieved by the electrolysis cell fed with a solution coming from the leaching and/or from the dissolving of the ashes, for those whose granulometry is less than $100\mu$, effected in independent prior operations of the electrolysis.

The metal tank of the corrosion cell has the advantage of being able to serve as a heat exchanger for maintaining the electrolyte at a suitable temperature, by removing the heat released by electrolysis and transported by the electrolyte.

Since the temperature of the electrolyte must not go above 50° C. and, preferably, remain less than 30° C. to avoid ammonia losses and to have the possibility of working with a good current density, the presence of the large surface, a good heat conductor, which is formed by the tank of the corrosion cell, can allow the heat to be removed without it being necessary to have recourse to a particular cooling system.

At the beginning of the operation of dissolving the mattes, it is necessary to introduce oxygen or air into the solution; later the reaction continues without new addition in the form of a chemical dissolving.

As an example, 4.8 kg of mattes, whose approximate area was about $0.118$ m$^2$, were placed in a tank made of stainless steel of quality 18/8, whose area was 0.34 m$^2$. The compositions of the treated mattes and of the electrolyte used were substantially those previously indicated. A flow of electrolyte was set up, this latter being takin from the anode compartments and fed into the corrosion cell.

Thus is obtained dissolving of the mattes of the order of 100 g per hour corresponding to current densities in the corrosion cell of:

cathode from 3 to 4 A/dm$^2$ anode from 6 to 8 A/dm$^2$

For the electrolysis of the different above-mentioned solutions, either the matte suitably shaped was used as the anode or a conventional incorrodible anode was used, for example made of graphite. The cathode was selected so that the zinc, once deposited, may be easily separated. Metal cathodes were advantageously used of the aluminum alloy type, or else made of titanium or of stainless steel, but preferably the first which are less costly.

The zinc alkaline solution used according to the invention allows the electrolysis to be carried out in industrially satisfactory conditions. Thus, the current density may go up to 20-25 A/dm$^2$ while still maintaining the qualities required of the metal deposit of zinc, i.e. a purity of at least 98.5% and the possibility of recovering it in compact form at the anode. Nevertheless, current densities of the order of 10 to 15 A/dm$^2$ were preferably used so as to have a good faradic efficiency, close to 1.

The whole of the steps which have just been described can be used in the installation shown in FIG. 1 and in which the ashes collected at the surface of galvanising baths are disposed in hoppers 51 from which they pass to a magnetic sorting device 52 eliminating the ferromagnetic particles.

On leaving the magnetic sorter, the ashes are fed to sifting device 53, separating the particles into two fractions.

Preferably, it is the fraction which comprises the largest particles and which may be directly re-introduced into galvanising bath B, which is subjected to the magnetic sorting, this latter producing no effect on the low granulometric fraction for the reasons laid out above.

In any case, the two granulometric fractions can be treated separately in tanks for leaching 54 and dissolving 55. From tank 54, in which the largest particles can be treated, there is directly recovered metal zinc powder and a solution containing zinc in the form of a complex, as well as colloidal hydroxides. This solution passes over the finest ashes of tank 55 where it is enriched to a zinc complex; taken up again by pump 56, it is then filtered, for example on filters 57 of the panel filter type, in order to eliminate the major part of the particles carried along and the colloidal hydroxide in suspension.

The alkaline solution containing the zinc complex is fed into the anode compartment(s) of an electrolytic cell 58. The anode compartments are separated from the rest of the solution by porous membranes 59 which retain the colloids not yet separated and, if need be, the sludges formed at anode 60 during the electrolysis.

To finish off the purification, the electrolyte of the cathode compartment is withdrawn by a pump 61, fed to a filtration device 62 formed for example by cartridge filters, then sent back to the electrolysis cell. In passing the solution goes into a cooling device 63, by means of which the electrolyte can be maintained in the most suitable range of temperatures.

At 64 is shown a make-up feed pipe for re-adjusting the volume and the composition of the electrolyte. Impoverished in zinc during the electrolysis, the solution is periodically or continuously taken up and fed back through pipe 65, to leaching and dissolving tanks.

As far as the mattes are concerned, they can be placed at anode 60 and dissolved electrolytically. The process then uses only the electrolysis cell 58 and the filtration circuit 61, 62, 63, as well as the pipe 64 for the make-up electrolyte.

In the two preceding cases, the zinc deposited electrolytically at the cathode is periodically recovered.

In the case of this electrolytic treatment, additives are advantageously introduced into the electrolyte solution whose role is to favor the formation of a regular, homogeneous, compact deposit such as agents called "levellers". Polyethylene glycols are advantageously used having an average molar mass of about 20,000, or polyvinyl ester compounds of the type such as those sold under the name "RHODOVIOL". Among the polyvinyl esters, preferably those are chosen whose ester index is between 20 and 240, and particularly about 70 and whose viscosity $\eta$ in a 4% solution in water is established between 4 and 40 cenitpoises, and preferably about 25 centipoises. These additives are introduced into the electrolysis solution in an amount of about 0.01% to 2%.

It is particularly advantageous to extract the zinc from the different alkaline solutions obtained from different wastes of the ashes and matte type coming from galvanising baths as described above by having recourse to the electrolysis installation 1 which will now be described.

This installation has however possibilities of application other than those for the treatment of said solutions. It can in particular be used for the treatment of electrolytic solutions obtained from zinc ores.

Such being the case, the electrolysis installation 1 of the invention which can be formed as follows, or in an equivalent way, may be placed in an electrolysis chain of the type shown in FIG. 2 and which comprises a tank 2 containing the electrolyte from which the zinc is to be extracted, this tank 2 being connected, on the one hand, to installation 1 and, on the other, to the installation not shown for dissolving the residues containing the zinc and which may for example use the process described above.

Installation 1 is fed from tank 2 by a pipe 3 comprising a circulation pump 4 and filtration means 5, the electrolyte leaving installation 1 being brought to tank 2 either by a drain pipe 6 normally closed by an electro-magnetic valve 7, or by an over-flow pipe 8 during operation of the installation.

Tank 2, which is fitted with a cooler 9 capable of maintaining the temperature of the electrolyte below a given value, generally of the order of 30° C., is sequentially fed with re-charged electrolyte from a filling tank 10 by piping 11 fitted with an electro-magnetic valve 12. By means of piping 13, fitted with an electro-magnetic valve 14, a part of the electrolyte contained in tank 2 can be fed back sequentially towards the dissolving installation, diagrammatically shown at 15, for products from which the zinc is extracted; piping 13 is in fact disposed at a level corresponding substantially to half the capacity of tank 2.

Filling tank 10 is fed from a storage tank 16 for re-charged electrolyte, i.e. coming from dissolving installation 15 through piping 17 fitted with a pump 18.

Tank 16 delivers the re-charged electrolyte to tank 10 through piping 19 fitted with a pump 20 and filtration means 21; tank 10 is moreover connected to tank 16 by an over-flow pipe 22.

Pipe 22 is positioned so that the amount of zinc contained in the volume of electrolyte defined thereby and by the position of pipe 11 is equal to the amount of metal extracted from the electrolyte increased by the amount of zinc contained in the volume eliminated through pipe 13 during opening of electro-magnetic valve 14.

The operation of the electrolysis chain thus formed is the following.

Supposing that tank 2 is filled with electrolyte coming from the dissolving installation and having a predetermined zinc content dependent on the characteristics of the electrolytic deposit desired, installation 1 is started up and the electrolyte flows under the influence of pump 4 for a period sufficient to bring the zinc content to a value below which the deposit has a tendency to become dendritic.

At that moment the electro-magnetic valve 14 is opened and the predetermined volume of electrolyte contained in tank 2 returns to the dissolving installation. The electro-magnetic valve 14 is then closed and it is through the opening of electro-magnetic valve 12 that a volume of re-charged electrolyte substantially equal to the volume of impoverished electrolyte which has just been returned to the dissolving installation, is introduced into tank 2.

Then, after electro-magnetic valve 12 has closed, tank 10 is supplied again from storage tank 16 with a volume of re-charged electrolyte corresponding to that which has been delivered to tank 2.

This succession is cyclically repeated depending on the impoverishment of the electrolyte in installation 1 and may be automatically controlled.

Figure 2:
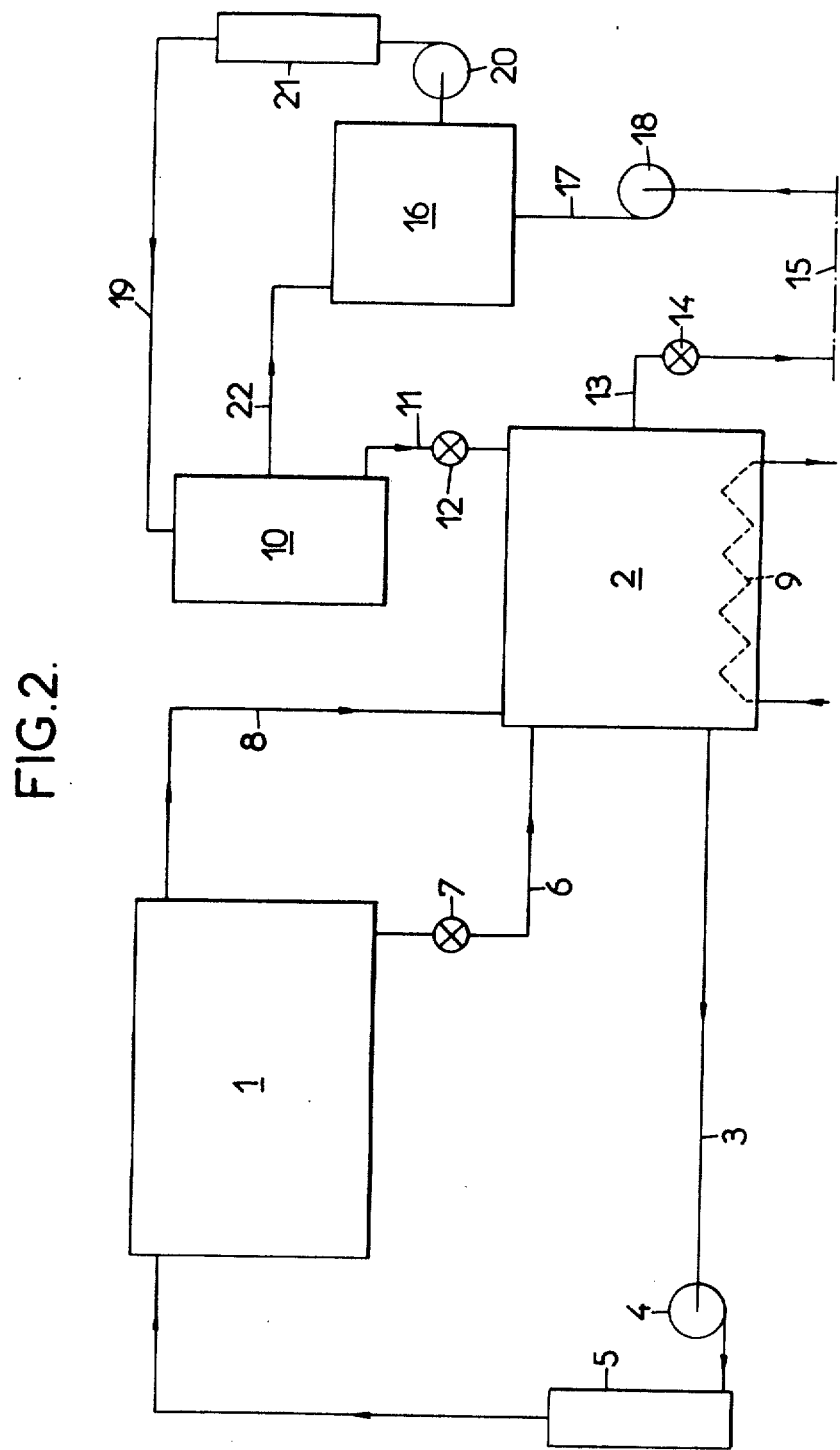
FIG. 2 is a schematic view of an electrolysis chain comprising an electrolysis installation according to the invention.

Now in so far as the electrolysis installation shown generally at 1 in FIG. 2 is more particularly concerned, it comprises a cathode 25 in the form of a cylinder of revolution capable of being rotated (direction of arrow $f_1$) about its horizontal axis XY and disposed above a cylindrical anode 26 having its concavity directed towards the cathode 25 and a generatrix parallel to the axis of this latter which it encloses at least partially.

In conformity with the invention, this installation comprises means 27 for bringing the electrolytic solutions coming from tank 2 through piping 3 into the inter-electrode space E, between the anode and the cathode, in a direction $Z_1$ substantially tangential to the cathode, said inter-electrode space being defined laterally by walls 28 substantially perpendicular to axis XY disposed at a small distance from the ends thereof so that the flow of electrolyte may be "conservative" along the cathode surface, in other words that the amount of electrolyte leaving the inter-electrode space is equivalent to the amount entering therein.

Advantageously the conveying means 27 are arranged in such a way that the injection of the electrolyte takes place uniformly along the cathode following jets J in a direction opposite that of arrow $f_1$.

According to another aspect of the invention, distance d separating cathode 25 from anode 26 decreases from the location where the electrolyte is injected into the interelectrode space E.

In the particularly advantageous embodiment which will be described further on and in which the anode also adopts a cylindrical surface of revolution with axis $X_1Y_1$ and a radius greater than that of the cathode, axis XY of the cathode and axis $X_1Y_1$ of the anode are paraliel but not emerged achieving the evolutive character of d.

The minimum of distance d separating the cathode from the anode is imposed by the technology of the installation, the necessity of ensuring that the whole of the cathode surface is swept by the electrolyte and the need to avoid any short-circuit following the formation of the zinc deposit.

In general this distance will be of the order of 10 mm but it is possible to go down to values of about 0.5 mm.

Means 27 can be formed;

either by injection nozzles suitably disposed along a line substantially parallel to a generatrix of the cathode, or by a tube parallel to such a generatrix and comprising a number of apertures through which the electrolyte is delivered.

The supplying of the injection nozzles in the first case and the distribution, number, position and diameters of the holes in the second case are such that the distribution of the electrolyte is even along the cathode.

The surface of this latter is formed from a metal chosen from those which allow the metal zinc deposit to be readily detached and which have a high hydrogen voltage, these metals may be those of the group comprising aluminium alloys, titanium, stainless steels and chromed metals.

The ratio between the diameter and the effective length of the cathode is advantageously from 0.60 to 0.85.

If the cathodes are too long they are sources of difficulties when detaching the zinc deposit.

To increase the zinc extraction capacity and rather than dispose in parallel a number of identical installations, it is possible to provide a very long cathode cooperating with a single anode and subdivided into successive sections by rings of a non conducting material, the ratio between the diameter and the length of a given section satisfying the above condition of diameter/effective length ratio.

The cathode is rotated by means arranged and adjusted so that the period of immersion in the electrolyte of a given point of the surface of the cathode is sufficient for the thickness of the deposit obtained during this immersion to have a value sufficient for the cohesion of the metal layer obtained to be greater than its adhesion to the cathode surface. It goes without saying that the value of this thickness must be less than the inter-electrode distance.

Figure 3:
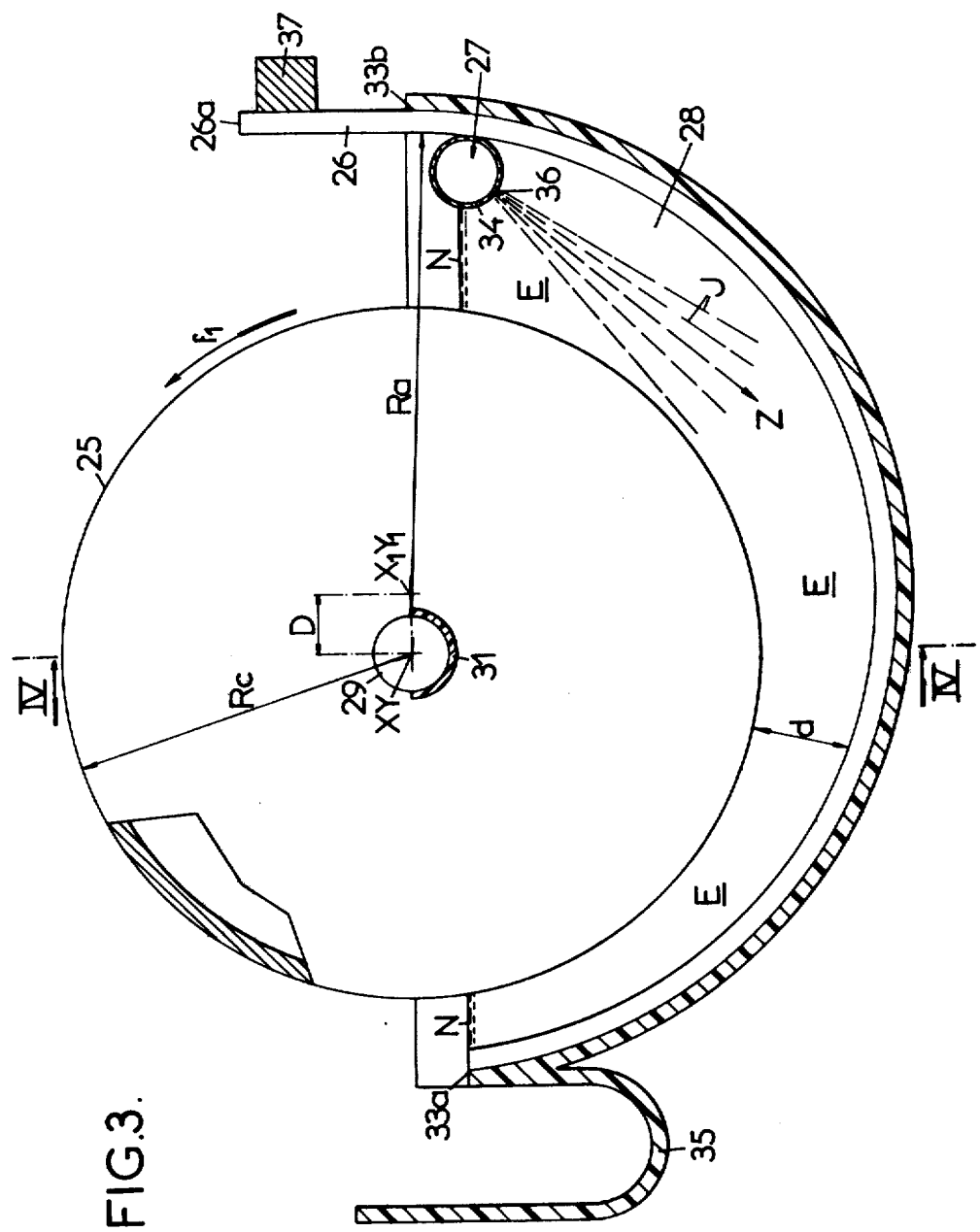
FIG. 3 is a schematic section perpendicular to the cathode of an electrolysis installation according to the invention, arranged in an advantageous embodiment.
Figure 4:
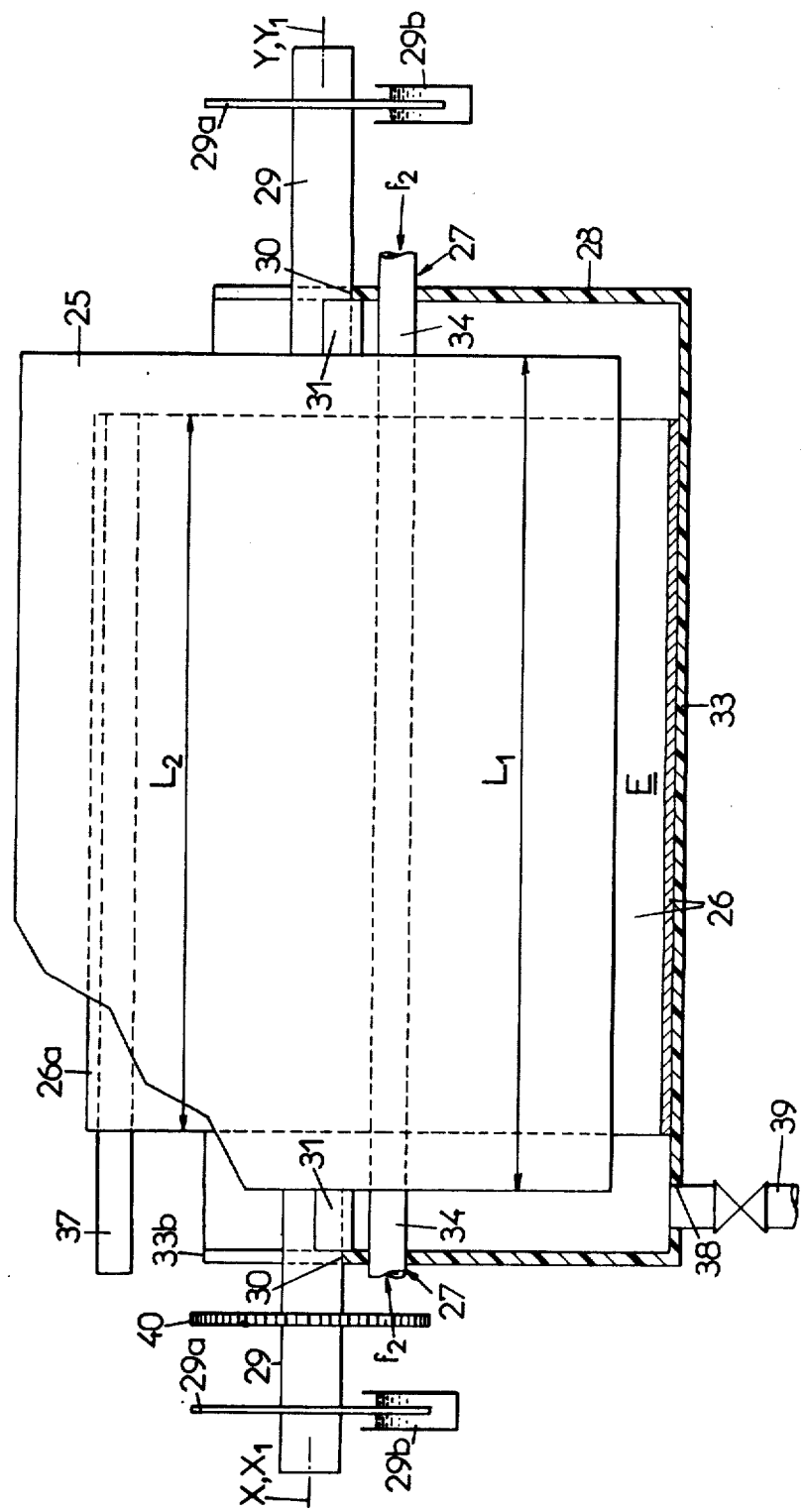
FIG. 4 shows schematically, in a sectional view along IV—IV of FIG. 3 to another scale, the main components of said installation.
Figure 5:
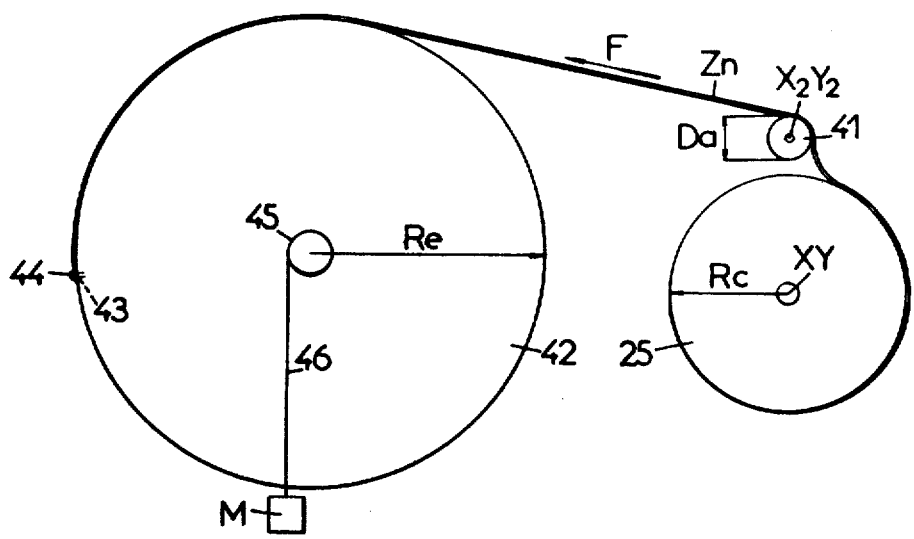
FIG. 5 shows schematically, in an outside view to another scale, certain other components of said installation.

Such being the case, the electrolysis installation in the advantageous embodiment illustrated by FIGS. 3 to 5 is formed as follows.

The cathode is in the form of a cylinder of revolution or drum made of duralumin of type AG5 closed at the ends by the same metal length $L_1$ of this drum is chosen less than 1 meter for the reasons outlined above, particularly equal to 70 cm and radius Rc, consequently, equal to 21 to 30 cm, particularly 27.5 cm.

Axis XY of this drum is given material from by two pivots 29 which may be made of the same metal as the drum, through which is fed the electric current and which rotate in two bearings 30 formed in walls 28.

The current is advantageously fed to pivots 29 by conducting discs 29a carried by these pivots and formed for example from mercurised iron, these discs rotating with the pivots and dipping into baths of mercury 29b connected to the voltage source.

The sections of pivots 29 and of cathode 25 are determined so that the voltage drop in the cathode is the smallest possible; in practice, values less than 20 millivolts can be achieved.

To fix the position of the cathode, positioning means are provided, for example two half shells 31, between walls 28 and the flanges of the drum, these shells may be carried by walls 28.

To avoid any trouble with sealing, it is provided in the embodiment described that the pivots 29 giving material form this axis XY are disposed above level N of the electrolyte, which will be discussed further on.

In the other cases, recourse is had to sealing means disposed in the necessary places.

Anode 26 has in section, as seen in FIG. 3, the shape of a cylindrical surface of revolution having radius Ra greater than radius Rc and a horizontal axis $X_1Y_1$ situated in the same horizontal plane as XY but staggered by a distance D in relation to this latter. The difference between Rc and Ra and the value D are chosen such that the inter-electrode distance d is 0.5 to 20 mm, particularly 10 mm at the place where d is minimum and from 15 to 50 mm, particularly 30 mm at the place where d is maximum.

The anode is formed from an incorrodible material on which the oxygen voltage is minimal. Very good results have been obtained by forming the anode surface from ruthenated titanium (titanium covered with a layer or ruthenium oxide).

As can be seen in FIG. 4, length $L_2$ of the anode in the embodiment described is less than length $L_1$ of the cathode to avoid edge effects on the cathode; in this embodiment, the difference $L_1 - L_2$ is of the order of 2 cm.

It is also possible to combat the edge effect by other means, particularly by placing suitable masks.

The anode is adapted to the inside of an electrolysis tank 33 formed advantageously from a non conducting and incorrodible synthetic material, particularly PVC, whose sidewalls are none other than walls 28 which were considered above. The length of tank 33 is greater than that of the cathode, so that between walls 28 and cathode 25 there is defined a dead volume, necessary although it has an unfavourable influence on the stirring of the electrolyte and on its speed of renewal, for in the absence of such a dead volume and for certain values of the current density applied (particularly 10 to 15 A dm$^{-2}$), the voltage at the terminals rises regularly in an undesirable way.

It is advantageously at the place where the distance d is the greatest that as can be seen in FIG. 3 are placed the means 27 for injecting the electrolyte.

In the case of the embodiment shown, these means are formed by a tube 34 supplied at both its ends with electrolyte following arrows $f_2$ and disposed against the surface of the anode 26 as shown, at the surface of the electrolyte contained in the inter-electrode space E and whose level N is defined by the edges of tank 33. It is edge 33a of tank 33 corresponding to the smallest distance d which determines the level of the electrolyte, this edge 33a being situated slightly lower than edge 33b corresponding to the greatest distance d. Edge 33a serves as an overflow-chute, the electrolyte being removed for example by a gutter 35 connected by piping 8 to tank 2.

Tube 34 comprises a number of holes 36 through which the electrolyte is delivered. In the case of the embodiment described, tube 34, having a length of 70 cm corresponding to the effective length of the cathode, comprises the following distribution of holes spread out in eleven zones, i.e. from the ends of the tube towards its middle:

two symmetrical zones of 12 holes of 2.5 mm diameter and spaced from each other by 5 mm;

two symmetrical zones of 12 holes of 2.3 mm diameter spaced 5 mm from each other;

two symmetrical zones of 12 holes of 2.1 mm diameter and spaced from each other by 5 mm;

two symmetrical zones of 12 holes of 1.9 mm diameter spaced 5 mm from each other;

two symmetrical zones of 12 holes of 1.7 mm diameter spaced 5 mm from each other;

in the middle of the tube, a zone of 20 holes of 1.5 mm diameter spaced 5 mm from each other.

In the embodiment illustrated, the diameter of tube 34 is 8 mm; it is formed from a synthetic material, particularly PVC.

The orientation of tube 34 about its axis is such that the principal direction of the jet of electrolyte J which emerges therefrom takes place substantially following Z below level N of the electrolyte contained in the tank, i.e. tangentially to cathode 25, this latter rotating according to arrow $f_1$ in a direction opposite that materialised by Z; tube 34 is thus almost completely immersed.

The electric supply to anode 26 can be provided by using a conducting metal bar 37, particularly made of copper, bolted to said anode near its end 26a which emerges above the electrolyte and which corresponds to the greatest interelectrode distance d.

All the metal parts which have just been described and which should not come into contact with the electrolyte, particularly on grounds of corrosion, are coated with a protecting layer proof against the influence of the medium and formed for example by adhesive sold under the trademark "Araldite".

In order to make it possible to drain the electrolysis tank in a time at least equal to that during which, in case of a breakdown, the polarisation of the electrodes can be maintained, said tank is fitted with a drain orifice 38 normally closed by said electro-magnetic valve 7 connected to tank 2 by pipe 46.

Rotation of cathode 25 can be achieved by means of an electric motor not shown through a speed reducer also not shown cooperating with gear 40 carried by one of the pivots 29.

The characteristics of these different elements are chosen such that the rotation speed of the drum, i.e. the period of immersion of a given point of this latter, allows the formation of a zinc layer sufficiently thick for its cohesion to be greater than its adhesion to the substrate.

In practice and in the case of the embodiment described, this speed is for example of the order of 1 revolution in three hours.

Under these last conditions, using two electrolytes coming respectively from the dissolving of ashes and mattes from galvanising metal baths (dissolving carried out according to the process of the invention described above), the compositions of these electrolytes being the following:

| Electrolyte n° 1 (dissolving of ashes) | | Electrolyte n° 2 (dissolving of mattes) | |
|---|---|---|---|
| NH$_4$Cl | 3 moles × l$^{-1}$ | NH$_4$Cl | 3 moles × l$^{-1}$ |
| NH$_4$OH | 6 moles × l$^{-1}$ | NH$_4$OH | 6 moles × l$^{-1}$ |
| Zn$^{II}$ | from 1.1 to | Zn$^{II}$ | from 0.8 to |

-continued

| Electrolyte n° 1 (dissolving of ashes) | | Electrolyte n° 2 (dissolving of mattes) | |
|---|---|---|---|
| | 2 moles × l$^{-1}$ | | 2 moles × l$^{-1}$ |
| (NH$_4$)$_2$CO$_3$ | 20 g/l | (NH$_4$)$_2$CO$_3$ | 20 g/l | by applying a current density respectively of 5 to 20 A/dm$^2$ for electrolyte no. 1 and from 5 to 40 A/dm$^2$ for electrolyte no. 2 and by establishing a conservative flow of the electrolytes along the cathode surface at a speed such that there are 20 to 100 renewals per hour, the electrolytic zinc layer reaches a thickness of respctively 0.10 to 0.50 mm and 0.10 to 1 mm for one and the other electrolyte at the outlet of the bath on edge 26a side of the anode.

Owing to the increasing evolutive character of distance d, the beginning of the deposit can take place at a current density higher than average. Owing to this increase of the current density, an under-layer of metal is obtained less adherent and consequently the deposit will be easier to detach.

The thickness of the deposit progresses with the rotation of the cathode, distance d increasing at the same time, owing to which the danger of a short-circuit due to the formation of dendrites is diminished if not ruled out altogether. Indeed, the growth of the dendrites whose formation is favoured by the increase of the thickness of the deposit and of the current density has less tendency to take place since the increase of the thickness of the deposit corresponds to a diminution of the local current density. Moreover, owing to the progressive increase of d, a dendrite has every chance of leaving the electrolyte due to the rotation before its length has been able to reach value d during its travel through the electrolyte.

Under the conditions of electrolysis thus described, the faradic efficiency is unitary and the zinc deposit is a very good quality. The speed of ejection of this deposit is 60 cm h$^{-1}$.

The zinc layer, when it has sufficiently emerged from the bath of electrolyte following rotation of the cathode, is detached by appropriate means, for example manually, then guided on to a drum 41 mounted loose on a shaft X$_2$Y$_2$ parallel to that of the cathode whose position is located vertically above this latter at a distance chosen so as to obtain the best angle for stripping the deposit from its support, it being emphasised that the diameter Da of this drum 41 is chosen in accordance with the same data.

In the case of the device used in the installation described above, this device being shown in FIG. 5, the dimensions of the different elements were the following:

Rc = 27.5 cm
Da = 10 cm
distance XY–X$_2$Y$_2$ = 33.5 cm

Still in this Fig., the zinc deposit is shown by Zn.

This deposit is rolled up on a winding drum 42 having a horizontal axis and a radius R$_e$ whose value is sufficiently great to allow the winding up of the zinc deposit; in the embodiment described R$_e$ = 50 cm.

The end of deposit Zn is fixed by a wire not shown to drum 42 at 43, for example by means of a clip 44.

The rotation of drum 42 can be achieved by means of a constant torque roller established for example by means of a pivot 45 coaxial to drum 42 about which is wound up wire 46 supporting mass M sufficiently heavy to ensure the detaching. Pivot 45 is mounted on drum 42 by a free-wheel system allowing mass M to be wound up again without having to modify the position of the drum.

Such being the case and whatever the embodiment adopted, there is thus provided a process and an electrolysis installation for the extraction by cathodic depositing of the zinc from solutions, the characteristics and the operation of the process and of the installation resulting sufficiently from what has gone before for it to be pointless to dwell thereon and which have numerous advantages, particularly:

as far as the process is concerned that of allowing mattes to be treated without previous shaping, that of limiting to the maximum the treatments of purification of the electrolyte before electrolysis owing to the use of an ammonia and ammonium chloride based electrolyte, that of allowing operation at high current densities;

as far as the electrolysis installation is concerned that of allowing the suppression of almost all the worker, that of allowing continuous operation with relatively small deposit thicknesses, that of allowing the treatment of alkaline or acid solutions of the kind in question coming from any source.

We claim:

1. An improved electrolysis installation for the continuous extraction of zinc from electrolyte solution by cathodic deposition comprising, a cathode in the form of a cylinder of revolution capable of being rotated about its horizontal axis and located above a cylindrical anode having its concavity directed towards the cathode and having a generatix parallel to the axis of the cathode which it encloses at least partially and, means for introducing the electrolyte solution to be treated into the interelectrode space between the cathode and the anode, wherein the improvement comprises means for introducing the electrolyte solution, said means located close to the surface of the anode and the surface of the electrolyte, so that the injection of said electrolyte takes place uniformly along the cathode in a direction opposite the rotational direction of the cathode into the interelectrode space which is laterally defined by walls substantially perpendicular to the axis of the cathode, the walls located at a small distance from the ends of the cathode, so that the amount of electrolyte leaving the inter-electrode space is equivalent to the amount entering therein, the interelectrode distance decreasing with distance from the location of the means for introducing the electrolyte solution.

2. An improved installation for the continuous extraction of zinc from electrolyte solution by cathodic deposit according to claim 1 wherein the cathode is in the form of a cylinder of revolution capable of being rotated about its horizontal axis and located above a concave anode cut out in a cylinder of revolution having a radius greater than that of the cathode, wherein the improvement comprises the cathode and the anode having axes which are parallel but not common, the interelectrode distance decreasing with distance from the location where the electrolyte is injected.

3. An improved installation for the continuous extraction of zinc from electrolyte solution by cathodic deposit according to claim 1 wherein the improvement comprises a roller used to roll up the zinc which is being extracted on the cathode, the roller having an axis parallel to that of the cathode and a radius greater than that of the cathode, the roller being driven at a tangential speed equal to that of the cathode.

4. An improved installation for the continuous extraction of zinc from electrolyte solution by cathodic deposit according to claim 1 wherein the improvement comprises the ratio between the diameter of the cathode and its effective length being from 0.60 to 0.85.

5. An improved installation for the continuous extraction of zinc from electrolyte solution by cathodic deposit according to claim 1 wherein the improvement comprises means for adjusting the rotation of the cathode such that the period of immersion of the cathode in the electrolyte at a given point on the cathode is such that the thickness obtained during the immersion in the electrolyte is sufficient for the cohesion of the metal obtained to be greater than the adhesion of the metal to the cathode surface.

* * * * *